(12) United States Patent
Noh et al.

(10) Patent No.: US 10,949,615 B2
(45) Date of Patent: Mar. 16, 2021

(54) APPARATUS AND METHOD FOR VERIFYING SENTENCE

(71) Applicant: NCSOFT Corporation, Seoul (KR)

(72) Inventors: Hyung Jong Noh, Seongnam-si (KR); Yeon Soo Lee, Seongnam-si (KR); Jung Sun Jang, Seongnam-si (KR); Sang Min Heo, Seongnam-si (KR)

(73) Assignee: NCSOFT Corporation, Seoul (KR)

( * ) Notice: Subject to any disclaimer, the term of this patent is extended or adjusted under 35 U.S.C. 154(b) by 0 days.

(21) Appl. No.: 15/851,626

(22) Filed: Dec. 21, 2017

(65) Prior Publication Data

US 2018/0189271 A1 Jul. 5, 2018

(30) Foreign Application Priority Data

Dec. 29, 2016 (KR) .................. 10-2016-0182613

(51) Int. Cl.
| | |
|---|---|
| *G06F 40/30* | (2020.01) |
| *G06N 3/08* | (2006.01) |
| *G06N 3/04* | (2006.01) |
| *G06F 40/253* | (2020.01) |

(52) U.S. Cl.
CPC ............ *G06F 40/30* (2020.01); *G06F 40/253* (2020.01); *G06N 3/0454* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 9,830,315 | B1* | 11/2017 | Xiao | .................... G06F 17/2785 |
| 10,083,162 | B2* | 9/2018 | Kasina | .................. G06F 17/241 |
| 2006/0173834 | A1* | 8/2006 | Brill | ...................... G06F 16/248 |
| 2009/0210218 | A1* | 8/2009 | Collobert | .............. G06F 17/277 |
| | | | | 704/9 |
| 2016/0092437 | A1* | 3/2016 | Endo | ..................... G06F 17/289 |
| | | | | 704/4 |

(Continued)

OTHER PUBLICATIONS

Rui Yan, Yiping Song, and Hua Wu. 2016. Learning to Respond with Deep Neural Networks for Retrieval-Based Human-Computer Conversation System. In Proceedings of the 39th International ACM SIGIR conference on Research and Development in Information Retrieval (SIGIR '16). ACM, New York, NY, USA, 55-64. (Year: 2016).*

(Continued)

*Primary Examiner* — Douglas Godbold
(74) *Attorney, Agent, or Firm* — Sughrue Mion, PLLC

(57) ABSTRACT

Disclosed are an apparatus and method for verifying a sentence. According to one embodiment of the present disclosure, the method for verifying a sentence includes receiving a sentence automatically generated from a plurality of pieces of data, and the plurality of pieces of data; generating a first embedding vector for each word included in the sentence; generating a second embedding vector for each of the plurality of pieces of data; and generating a verification result value regarding the sentence by using a determination model including a first convolutional neural network for generating a feature vector from the first embedding vector and a second convolutional neural network for generating a feature vector from the second embedding vector.

12 Claims, 5 Drawing Sheets

(56) References Cited

U.S. PATENT DOCUMENTS

| 2016/0196258 A1* | 7/2016 | Ma ...................... G06F 17/2785 |
| | | 704/8 |
| 2016/0217129 A1* | 7/2016 | Lu ....................... G06F 17/2785 |
| 2017/0060855 A1* | 3/2017 | Song ................... G06F 17/2818 |
| 2017/0061250 A1* | 3/2017 | Gao .................... G06F 16/3347 |
| 2017/0337474 A1* | 11/2017 | Li ........................... G06N 5/02 |
| 2018/0075368 A1* | 3/2018 | Brennan ................ G06N 3/006 |
| 2018/0143760 A1* | 5/2018 | Orr ..................... G06F 3/04886 |

OTHER PUBLICATIONS

G. E. Dahl, T. N. Sainath and G. E. Hinton, "Improving deep neural networks for LVCSR using rectified linear units and dropout," 2013 IEEE International Conference on Acoustics, Speech and Signal Processing, Vancouver, BC, 2013, pp. 8609-8613. (Year: 2013).*

* cited by examiner

APPARATUS AND METHOD FOR VERIFYING SENTENCE

CROSS-REFERENCE TO RELATED APPLICATION

This application claims priority to and the benefit of Korean Patent Application No. 10-2016-0182613, filed on Dec. 29, 2016, the disclosure of which is incorporated herein by reference in its entirety.

BACKGROUND

1. Field

Embodiments of the present disclosure relate to deep learning technology using a convolutional neural network.

2. Discussion of Related Art

Recently, automatic sentence generation using a machine has been actively studied in a natural language processing field such as statistical machine translation, document summarization, paraphrasing, etc. and an industrial field such as media and education. In particular, robot journalism has been on the rise in the media field, and has been utilized to automatically write an article in a publication such as the AP, the LA Times, and the like.

In such automatic sentence generation technology, a sentence may be generated with wrong words or grammatical errors since the sentence is generated on the basis of rules or through a probabilistic method using a sentence generation model. Therefore, measures to effectively verify a wrong sentence to use a sentence generated by automatic sentence generation as a newspaper article or the like are necessary.

SUMMARY

Embodiments of the present disclosure provide an apparatus and method for verifying a sentence automatically generated from data.

According to an aspect of the present disclosure, there is provided a method for verifying a sentence performed in a computing device comprising one or more processors and a memory configured to store one or more programs to be executed by the one or more processors, the method including: receiving a sentence automatically generated from a plurality of pieces of data and the plurality of pieces of data; generating a first embedding vector for each word included in the sentence; generating a second embedding vector for each of the plurality of pieces of data; and generating a verification result value for the sentence by using a determination model including a first convolutional neural network for generating a feature vector from the first embedding vector and a second convolutional neural network for generating a feature vector from the second embedding vector.

The first convolutional neural network may include a first convolution layer for outputting a first feature vector by performing a convolution operation to the first embedding vector, and a first pooling layer for outputting a second feature vector by performing sub-sampling to the first feature vector, and the second convolutional neural network may include a second convolution layer for outputting a third feature vector by performing a convolution operation to the second embedding vector, and a second pooling layer for outputting a fourth feature vector by performing sub-sampling to the third feature vector.

The first convolution layer and the second convolution layer may perform the convolution operation using a hyperbolic tangent function or a rectified linear unit (ReLU) function as an activation function.

The first pooling layer and the second pooling layer may perform the sub-sampling using a max pooling function.

The determination model may further include a fully-connected layer for receiving a fifth feature vector obtained by concatenating the second feature vector and the fourth feature vector; and an output layer for outputting the verification result value regarding the sentence from output of the fully-connected layer.

The output layer may outputs the verification result value using a softmax function as an activation function.

According to another aspect of the present disclosure, there is provided an apparatus for verifying a sentence, the apparatus including: an inputter configured to receive a sentence automatically generated from a plurality of pieces of data, and the plurality of pieces of data; an embedding vector generator configured to generate a first embedding vector for each word included in the sentence and generates a second embedding vector for each of the plurality of pieces of data; and a determiner configured to generates a verification result value regarding the sentence by using a determination model including a first convolutional neural network for generating a feature vector from the first embedding vector and a second convolutional neural network for generating a feature vector from the second embedding vector.

The first convolutional neural network may include a first convolution layer for outputting a first feature vector by performing a convolution operation to the first embedding vector, and a first pooling layer for outputting a second feature vector by performing sub-sampling to the first feature vector, and the second convolutional neural network may include a second convolution layer for outputting a third feature vector by performing a convolution operation to the second embedding vector, and a second pooling layer for outputting a fourth feature vector by performing sub-sampling to the third feature vector.

The first convolution layer and the second convolution layer may perform the convolution operation using a hyperbolic tangent function or an ReLU function as an activation function.

The first pooling layer and the second pooling layer may perform the sub-sampling using a max pooling function.

The determination model may further include a fully-connected layer for receiving a fifth feature vector obtained by concatenating the second feature vector and the fourth feature vector; and an output layer for outputting the verification result value regarding the sentence from output of the fully-connected layer.

The output layer may output the verification result value using a softmax function as an activation function.

BRIEF DESCRIPTION OF THE DRAWINGS

The above and other objects, features, and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Embodiments of the present disclosure will be described below with reference to the accompanying drawings. The detailed descriptions set forth herein are provided for a better comprehensive understanding of a method, apparatus, and/or system described in this specification. However, these descriptions are merely examples and are not to be construed as limiting the present disclosure.

In descriptions of the embodiments of the present disclosure, detailed descriptions about a publicly known art related to the present disclosure will be omitted when it is determined that the detailed descriptions obscure the gist of the present disclosure. Further, terms used herein, which are defined by taking the functions of the present disclosure into account, may vary depending on users, an intention or convention of an operator, and the like. Therefore, definitions should be based on content given throughout the specification. The terms in the detailed descriptions are used only for describing the embodiments of the present disclosure and are not restrictively used. Unless otherwise indicated, terms having a singular form also have a plural meaning. In the present disclosure, expressions such as "include" or "have" indicate the inclusion of certain features, numerals, operations, operations, elements, or a combination thereof, and are not to be construed as excluding the presence or possibility of one or more other certain features, numerals, operations, operations, elements, or a combination thereof.

Figure 1:
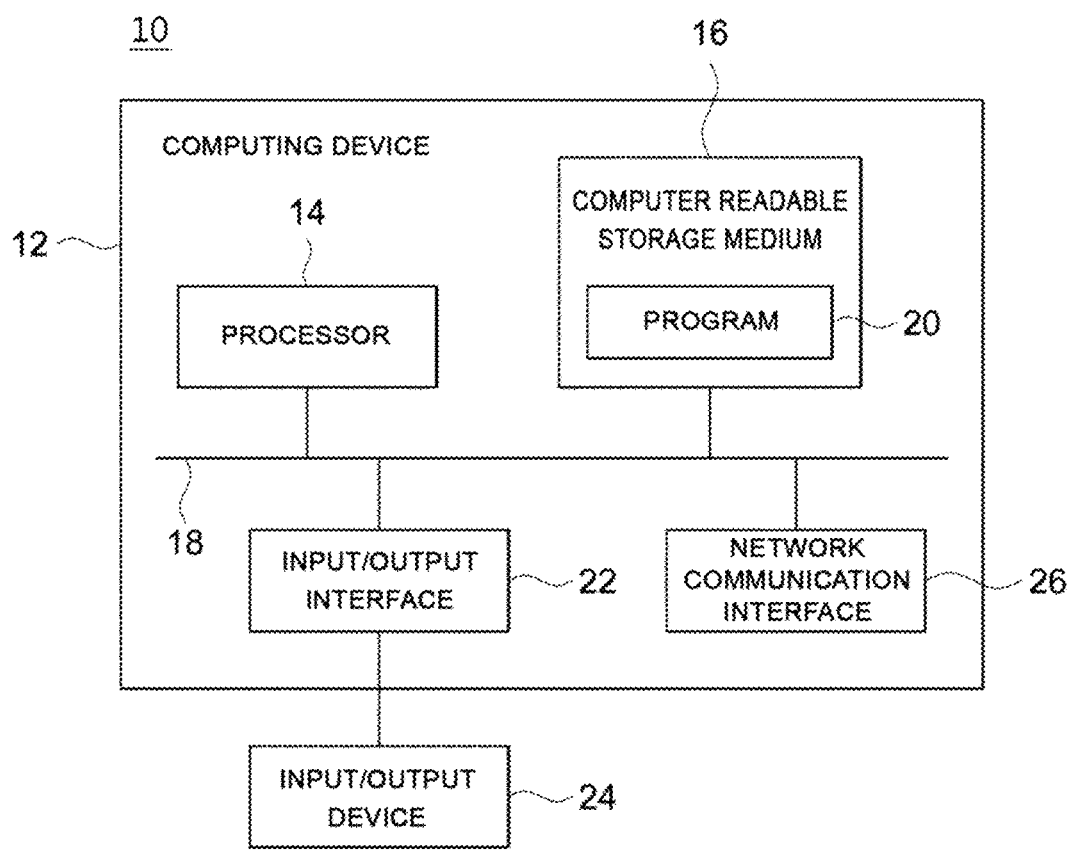
FIG. 1 is a block diagram for exemplifying and describing a computing environment including a computing device suitable for use in the exemplified embodiments.

FIG. 1 is a block diagram for exemplifying and describing a computing environment 10 including a computing device suitable for use in the exemplified embodiments. In the illustrated embodiments, components may have functions and abilities different from those of the following descriptions, and there may be another component in addition to those described in the following.

The computing environment 10 shown in FIG. 1 includes a computing device 12. According to one embodiment, the computing device 12 may be a sentence verification apparatus according to the embodiments of the present disclosure. The computing device 12 includes at least one processor 14, a computer readable storage medium 16 and a communication bus 18. The processor 14 may make the computing device 12 operate according to the above-mentioned exemplified embodiments. For example, the processor 14 may execute one or more programs stored in the computer readable storage medium 16. The one or more programs may include one or more computer executable instructions, and the computer executable instruction may be configured to make the computing device 12 operate according to the exemplified embodiments when executed by the processor 14.

The computer readable storage medium 16 is configured to store a computer executable instruction or program code, program data, and/or information having other suitable forms. A program 20 stored in the computer readable storage medium 16 includes an instruction set executable by the processor 14. According to one embodiment, the computer readable storage medium 16 may include a memory (i.e. a volatile memory such as a random access memory (RAM), a nonvolatile memory, or a proper combination thereof), one or more of magnetic disk storage devices, optical disk storage devices, flash memory devices, other storage media accessed by the computing device 12 and capable of storing desired information, or a proper combination thereof.

The communication bus 18 connects various components of the computing device 12, such as the processor 14 and the computer readable storage medium 16, with each other.

The computing device 12 may also include one or more input/output interfaces 22 providing interfaces for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. An exemplary input/output device 24 may include an input device such as a pointing device (e.g. a mouse, a trackpad, and the like), a keyboard, a touch input device (e.g. a touch pad, a touch screen, and the like), a voice or sound input device, various kinds of sensing devices, and/or a photographing device, and/or an output device such as a display device, a printer, a loudspeaker, and/or a network card. The exemplary input/output device 24 may be internally provided in the computing device 12 as a component of the computing device 12, or may be provided separately from the computing device 12 and connected to the computing device 12.

Embodiments of the present disclosure are directed to a method of receiving a sentence automatically generated from a plurality of pieces of data and pieces of data used for generating a corresponding sentence, and verifying whether the automatically generated sentence is correctly generated.

In this case, a sentence to be verified may include, for example, a sentence generated through various methods of using a plurality of pieces of data to automatically generate a natural language sentence related to corresponding data, and the sentence is not limited to a sentence generated through a specific method.

Meanwhile, for example, the data used for the sentence generation may include structured data stored in a structured form in a relational database. Further, for example, the kind of data used for the sentence generation may include game records (e.g. winning teams, scores, stadiums, team names, and the like.) of sports games, such as basketball, baseball, and the like, weather data (e.g. locations, a temperature and rainfall according to locations, and the like), and the like, but is not absolutely limited thereto. Besides the above examples, various kinds of data may be used.

According to one embodiment of the present disclosure, the computing device 12 may receive an automatically generated sentence and a plurality of pieces of data used for generating the sentence and output a verification result value regarding the sentence input using a previously learned determination model.

In this case, the determination model may be learned through supervised learning using training data in which a plurality of sentences and a plurality of pieces of data used for generating the sentences are used as an input and a verification result value (for example, 0 or 1) showing whether each of the input sentences is correct or not is used as an output.

Meanwhile, detailed descriptions of the determination model will be given below.

Figure 2:
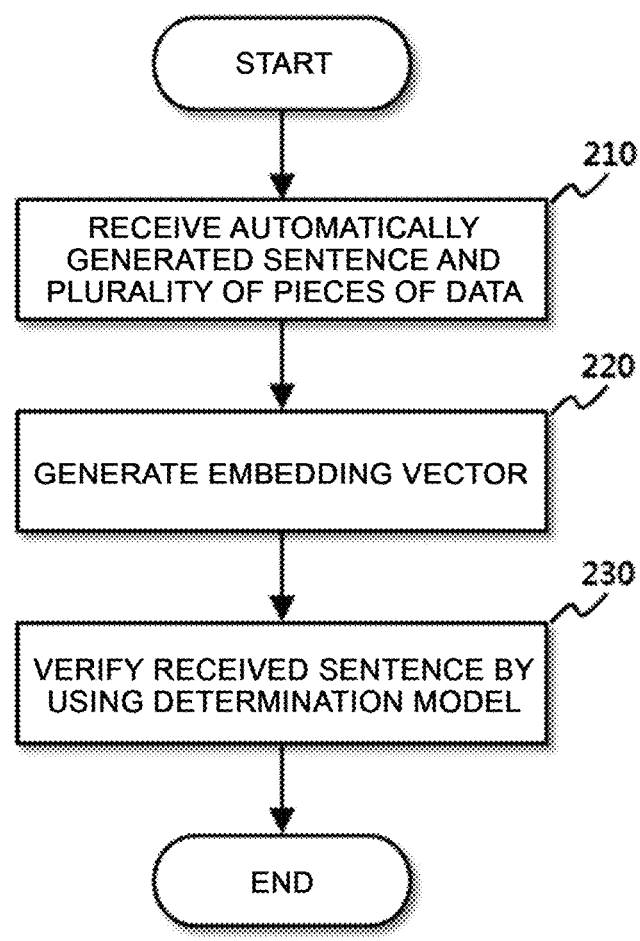
FIG. 2 is a flowchart of a method of verifying a sentence according to one embodiment of the present disclosure.

FIG. 2 is a flowchart of a method of verifying a sentence according to one embodiment of the present disclosure;

For example, the method shown in FIG. 2 may be performed by the computing device 12 that includes one or more processors and a memory configured to store one or more programs to be executed by the one or more processors.

Meanwhile, the flowchart shown in FIG. 2 shows the method being divided into a plurality of operations, but at least some of the operations may be reordered, performed in combination with another operation, omitted, divided into sub operations, or performed with one or more added operations (not shown).

Referring to FIG. 2, in Operation 210, the computing device 12 receives an automatically generated sentence and a plurality of pieces of data used for generating the sentence.

In Operation 220, the computing device 12 generates an embedding vector for each word included in the received input sentence through word embedding and an embedding vector for each of the plurality of pieces of input data Specifically, according to one embodiment of the present disclosure, the computing device 12 converts each of the words included in the input sentence into a vector with a preset dimension and generates an embedding vector (hereinafter, referred to as a first embedding vector) for each of the words by a product of each of the converted vectors and an embedding matrix having a preset dimension.

Further, the computing device 12 converts each of the plurality of pieces of input data into a vector with the preset dimension and generates an embedding vector (hereinafter, referred to as a second embedding vector) for each of the pieces of data by a product of each of the converted vectors and an embedding matrix having the preset dimension.

Figure 3:
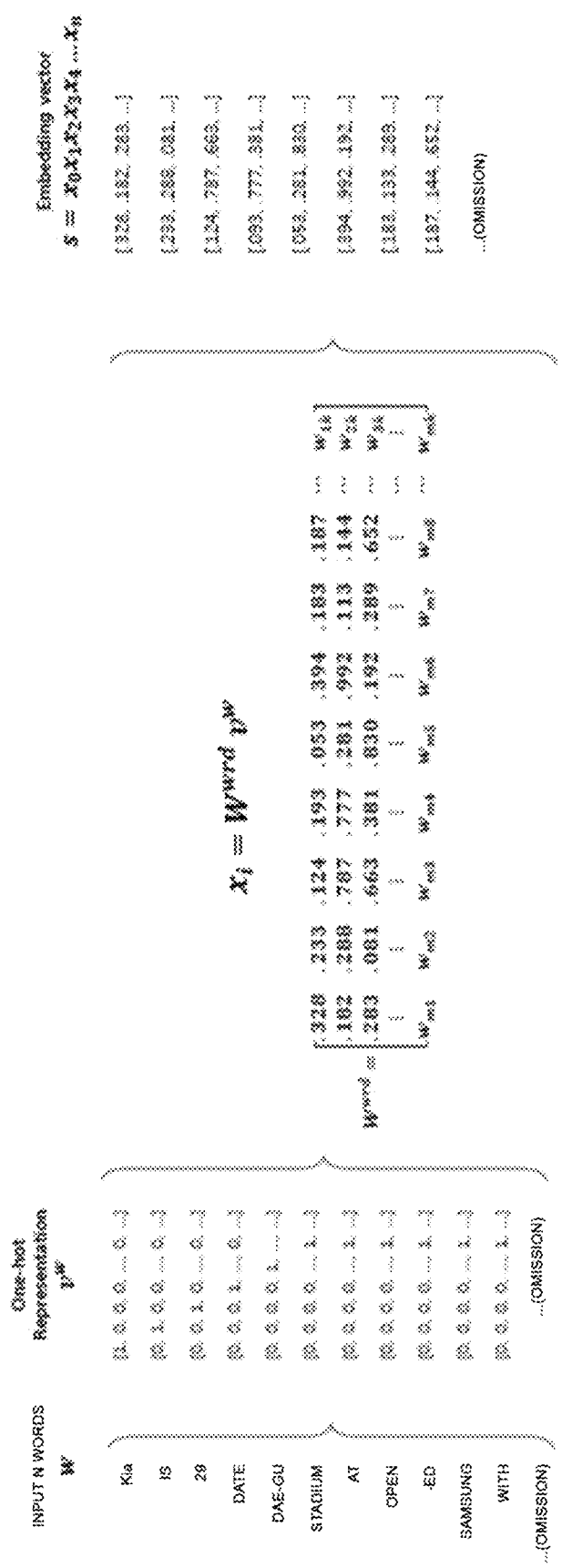
FIG. 3 illustrates an example for describing a process of generating a first embedding vector according to one embodiment of the present disclosure.

FIG. 3 illustrates an example for describing a process of generating the first embedding vector according to one embodiment of the present disclosure.

Referring to FIG. 3, first, the computing device 12 generates an m-dimensional one-hot vector $v^w$ for each word w included in an input sentence. In this case, the one-hot vector refers to a vector in which only a value of a dimension assigned to a specific word is 1 and values of the other dimensions are 0 when one of m dimensions is assigned to each of the words and it is assumed that the total number of words included in sentences used in determination model learning is m.

Thus, when n words w are included in the input sentence, n one-hot vectors $v^w$ having a dimension of 1×m corresponding to each of the words w are generated.

Meanwhile, after generating the one-hot vector $v^w$ for each of the words w, the computing device 12 may generate a first embedding vector $x_i$ for each of the words w by a product of the generated one-hot vector $v^w$ and an embedding matrix $W^{wrd}$ having a dimension of m×k.

In this case, for example, the embedding matrix $W^{wrd}$ may be learned through unsupervised learning using a back propagation algorithm from the sentences used in the learning.

Meanwhile, when the n words w are included in the input sentence and the first embedding vector $x_i$ for each of the words w is generated using the embedding matrix having the dimension of m×k, as described above, the input document may be represented by an embedding vector matrix $s_1$ having a dimension of n×k by connecting the n generated embedding vectors $x_i$, as shown in the following expression 1.

$$s = x_0 x_1 x_2 \ldots x_n \quad (1)$$

Meanwhile, the second embedding vector may be generated by a process identical to the generating of the first embedding vector shown in FIG. 3.

Specifically, the computing device 12 generates a p-dimensional one-hot vector $v^d$ for each piece of input data d.

Thus, when the number of the pieces of input data is q, q one-hot vectors $v^d$ having a dimension of 1×p corresponding to each of the pieces of data d are generated.

Meanwhile, after generating the one-hot vector $v^d$ for each of the pieces of data d, the computing device 12 may generate a second embedding vector $y_i$ for each of the pieces of data d by a product of the generated one-hot vector $v^d$ and an embedding matrix $W^d$ having a dimension of p×1.

In this case, for example, the embedding matrix $W^d$ may be learned through unsupervised learning using a back propagation algorithm from the data used in the learning.

Meanwhile, when the number of pieces of input data d is q and the second embedding vector $y_i$ for each of the pieces of data d is generated using the embedding matrix having the dimension of p×1, as described above, the entirety of the input data may be represented by an embedding vector matrix $s_2$ having a dimension of q×1 by connecting the q generated embedding vectors $y_i$, as shown in the following expression 2.

$$s_2 = y_0 y_1 y_2 \ldots y_q \quad (2)$$

Referring back to FIG. 2, in Operation 230, the computing device 12 generates a verification result for the input sentence through the determination model that includes the first convolutional neural network for generating a feature vector from the first embedding vector and the second convolutional neural network for generating a feature vector from the second embedding vector.

Figure 4:
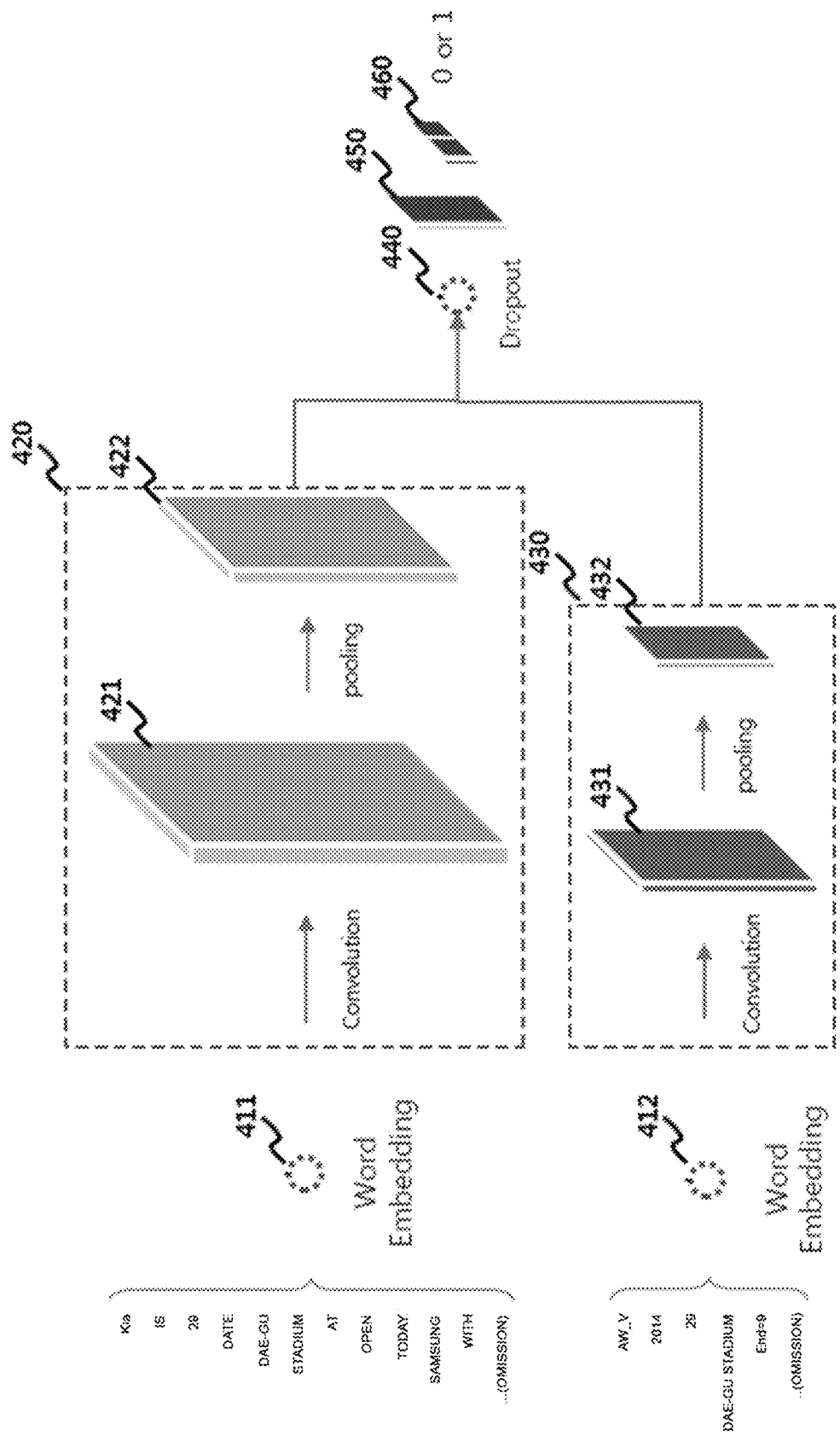
FIG. 4 is a diagram of a detection model according to one embodiment of the present disclosure.

Specifically, FIG. 4 is a diagram of a detection model according to one embodiment of the present disclosure.

Referring to FIG. 4, according to one embodiment of the present disclosure the determination model may include a first convolutional neural network 420, a second convolutional neural network 430, a fully-connected neural network layer 450, and an output layer 460.

The first convolutional neural network 420 may include a first convolution layer 421, and a first pooling layer 422.

Specifically, the first convolution layer 421 receives the embedding vector matrix $s_1$ generated through word embedding 411 for each of the words included in the input sentence, and outputs a first feature vector through a convolution operation between the embedding vector matrix $s_1$ and one or more filters.

Specifically, when a vector $x_{i:j}$ is a vector obtained by connecting first embedding vectors with regard to words from an $i^{th}$ word to a $j^{th}$ word of the input sentence, a convolution operation for a matrix $x_{i:i+h-1}$ including h adjacent words is performed in the first convolution layer 421.

For example, a combination X of matrices that can be made with embedding vectors for three adjacent words in a sentence including n words is represented by the following expression 3.

$$X = \{x_{1:3}, x_{2:4}, x_{3:5}, x_{4:6}, \ldots, x_{n-2:n}\} \quad (3)$$

Further, the convolution operation for the elements of the combination X may be performed by the following expression 4.

$$c_i = f(w \cdot x_{i:i+h-1} + b) \quad (4)$$

In the expression 4, f indicates an activation function of the first convolution layer 421 and, for example, may use nonlinear functions such as a hyperbolic tangent (tanh) function, a rectified linear unit (ReLU), and the like.

Further, in the expression 4, w indicates a weight matrix, and b indicates a bias which can be learned through a back propagation algorithm using a gradient descent method, for example, an Adadelta method, an Adagrad method, an RMSProp method, an Adam method, and the like.

Meanwhile, a first feature vector $c=[c_1, c_2, c_3, c_4, \ldots, c_{n-2}]$ can be obtained by the convolution operation performed in the first convolution layer 421.

The first pooling layer 422 extracts major features by applying sub-sampling to the first feature vector c output from the first convolution layer 421.

In this case, according to one embodiment of the present disclosure, the first pooling layer 422 may use a max pooling function or an average pooling function to extract major features from the first feature vector c.

For example, when the first pooling layer 422 has a pooling length of 3 and a stride of 3 under the assumption that the max pooling function is employed in the first pooling layer 422, a second feature vector c' output from the first feature vector c input to the first pooling layer 422 is equal to $c'[\max(c_{1:3}), \max(c_{2:4}), \max(c_{n-4:n-2})]$.

Meanwhile, the second convolutional neural network 430 may include a second convolution layer 431 and a second pooling layer 432.

Specifically, the second convolution layer 431 may receive the embedding vector matrix $s_2$ generated through word embedding 412 for each of the pieces of input data, and output a third feature vector through the convolution operation between the embedding vector matrix $s_2$ and one or more filters. In this case, a convolution operation performed in the second convolution layer 431 may be carried out in the same manner as the convolution operation performed in the first convolution layer 421.

The second pooling layer 432 may output a fourth feature vector by applying sub-sampling to the third feature vector output from the second convolution layer 431. In this case, the sub-sampling performed in the second pooling layer 432 may be carried out in the same manner as that of the first pooling layer 431.

Meanwhile, the fully-connected layer 450 receives a fifth feature vector obtained by concatenating the second feature vector output from the first pooling layer 422 and the fourth feature vector output from the second pooling layer 432.

In this case, according to one embodiment of the present disclosure, a dropout 440 may be applied between the first pooling layer 422 and the fully connected layer 450 and between the second pooling layer 432 and the fully connected layer 450 to avoid an overfitting phenomenon.

Meanwhile, the output layer 460 is located behind to the fully-connected layer 450 and outputs a verification result value regarding the input sentence from the vectors output from the fully-connected layer 450.

In this case, according to one embodiment of the present disclosure, a softmax function may be used as the activation function for the output layer.

Figure 5:
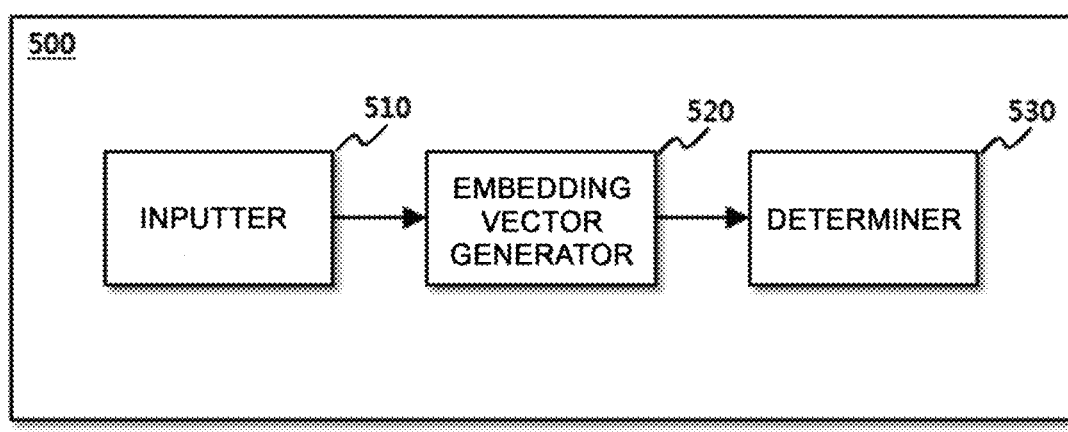
FIG. 5 is a diagram of a sentence verification apparatus according to one embodiment of the present disclosure.

FIG. 5 is a diagram of a sentence verification apparatus according to one embodiment of the present disclosure.

Referring to FIG. 5, according to one embodiment of the present disclosure, a sentence verification apparatus 500 includes an inputter 510, an embedding vector generator 520, and a determiner 530.

The inputter 510 receives a sentence to be verified and a plurality of pieces of data used to generate the sentence.

The embedding vector generator 520 generates a first embedding vector for each word included in the received sentence and a second embedding vector for each of the plurality of pieces of received data.

Specifically, according to one embodiment of the present disclosure, the embedding vector generator 520 may generate a one-hot vector for each of the words included in the received sentence, and then generate the first embedding vector by a product of the one-hot vector and an embedding matrix.

Further, the embedding vector generator 520 may generate a one-hot vector for each of the plurality of pieces of received data and generate the second embedding vector for each of the pieces of data by a product of the one-hot vector and a embedding matrix.

The determiner 530 may output a verification result value regarding the input sentence by using a determination model, which includes a first convolutional neural network for generating a feature vector from a first embedding vector and a second convolutional neural network for generating a feature vector from a second embedding vector.

Specifically, the determination model may have the same structure as that shown in FIG. 4, and the determiner 530 may use the determination model to output a determination result value regarding the input sentence by the same method as described above.

Meanwhile, according to one embodiment, the sentence verification apparatus 500 may be implemented in a computing device that includes at least one processor and a computer readable recording medium connected to the processor. The computer readable recording medium may be internally or externally provided in the processor and connected to the processor by various well-known means. The processor in the computing device may make each computing device operate according to exemplified embodiments described in this specification. For example, the processor may execute an instruction stored in the computer readable recording medium, and the instruction stored in the computer readable recording medium may be configured to make the computing device operate according to the exemplified embodiments described in this specification when executed by the processor.

Meanwhile, one embodiment of the present disclosure may include a computer readable recording medium including a program to implement the methods described in this specification on a computer. The computer readable recording medium may include one or a combination of a program command, a local data file, a local data structure, and the like. The medium may be specially designed and configured for the present disclosure, or may be typically available in the computer software field. The computer readable recording medium may include, for example, a magnetic medium such as a hard disk, a floppy disk, and a magnetic tape; an optical recording medium such as a compact disc read-only memory (CD-ROM) and a digital versatile disc (DVD); a magnetic-optical medium such as a floppy disk; and a hardware device specially configured to store and execute a program command, such as a ROM, a RAM, a flash memory, and the like. For example, the program command may include not only a machine language code produced by a compiler, but also a high-level language code to be executable by a computer through an interpreter or the like.

According to the embodiments of the present disclosure, an automatically generated sentence is effectively verified without a user's intervention since whether the sentence is correctly generated is automatically determined on the basis of the automatically generated sentence and data used to generate a document.

Although exemplary embodiments of the present disclosure have been described in detail, it should be appreciated by a person having ordinary skill in the art that various changes may be made to the above exemplary embodiments without departing from the scope of the present disclosure, and the scope is not limited to the above embodiments but defined in the following claims and their equivalents.

What is claimed is:

1. A method for verifying a sentence performed in a computing device comprising one or more processors and a memory configured to store one or more programs to be executed by the one or more processors, the method comprising:
    receiving a sentence automatically generated from a plurality of pieces of data, and the plurality of pieces of data;
    generating a first embedding vector for each word included in the sentence;
    generating a second embedding vector for each of the plurality of pieces of data; and
    generating a verification result value regarding the sentence by using a determination model comprising a first convolutional neural network for generating a feature vector from the first embedding vector and a second convolutional neural network for generating a feature vector from the second embedding vector,
    wherein the plurality of pieces of data include structured data, and
    wherein the verification result value indicates whether or not the sentence is correctly generated from the plurality of pieces of data.

2. The method of claim 1, wherein the first convolutional neural network comprises a first convolution layer for outputting a first feature vector by performing a convolution operation to the first embedding vector, and a first pooling layer for outputting a second feature vector by performing sub-sampling to the first feature vector, and
    the second convolutional neural network comprises a second convolution layer for outputting a third feature vector by performing a convolution operation to the second embedding vector, and a second pooling layer for outputting a fourth feature vector by performing sub-sampling to the third feature vector.

3. The method of claim 2, wherein the first convolution layer and the second convolution layer perform the convolution operation using a hyperbolic tangent function or a rectified linear unit (ReLU) function as an activation function.

4. The method of claim 2, wherein the first pooling layer and the second pooling layer perform the sub-sampling using a max pooling function.

5. The method of claim 2, wherein the determination model further comprises
    a fully-connected layer for receiving a fifth feature vector obtained by concatenating the second feature vector and the fourth feature vector; and
    an output layer for outputting the verification result value regarding the sentence from output of the fully-connected layer.

6. The method of claim 5, wherein the output layer outputs the verification result value using a softmax function as an activation function.

7. An apparatus for verifying a sentence, the apparatus comprising:
    one or more hardware processors and one or more computer readable media storing instructions that, when executed by the one or more hardware processors, cause the apparatus to:
    receive a sentence automatically generated from a plurality of pieces of data, and the plurality of pieces of data;
    generate a first embedding vector for each word included in the sentence;
    generate a second embedding vector for each of the plurality of pieces of data; and
    generate a verification result value regarding the sentence by using a determination model comprising a first convolutional neural network for generating a feature vector from the first embedding vector and a second convolutional neural network for generating a feature vector from the second embedding vector,
    wherein the plurality of pieces of data include structured data, and
    wherein the verification result value indicates whether or not the sentence is correctly generated from the plurality of pieces of data.

8. The apparatus of claim 7, wherein the first convolutional neural network comprises a first convolution layer for outputting a first feature vector by performing a convolution operation to the first embedding vector, and a first pooling layer for outputting a second feature vector by performing sub-sampling to the first feature vector, and
    the second convolutional neural network comprises a second convolution layer for outputting a third feature vector by performing a convolution operation to the second embedding vector, and a second pooling layer for outputting a fourth feature vector by performing sub-sampling to the third feature vector.

9. The apparatus of claim 8, wherein the first convolution layer and the second convolution layer perform the convolution operation using a hyperbolic tangent function or a rectified linear unit (ReLU) function as an activation function.

10. The apparatus of claim 8, wherein the first pooling layer and the second pooling layer perform the sub-sampling using a max pooling function to perform the sub-sampling.

11. The apparatus of claim 8, wherein the determination model further comprises
    a fully-connected layer for receiving a fifth feature vector obtained by concatenating the second feature vector and the fourth feature vector; and
    an output layer for outputting the verification result value regarding the sentence from output of the fully-connected layer.

12. The apparatus of claim 11, wherein the output layer outputs the verification result value using a softmax function as an activation function.

* * * * *